(12) United States Patent
Hoch et al.

(10) Patent No.: US 11,483,484 B2
(45) Date of Patent: Oct. 25, 2022

(54) SYSTEMS AND METHODS FOR IMAGING OF MOVING OBJECTS USING MULTIPLE CAMERAS

(71) Applicant: NEC Corporation Of America, Herzlia (IL)

(72) Inventors: Yaacov Hoch, Ramat-Gan (IL); Tsvi Lev, Tel-Aviv (IL)

(73) Assignee: NEC Corporation Of America, Herzlia (IL)

(*) Notice: Subject to any disclaimer, the term of this patent is extended or adjusted under 35 U.S.C. 154(b) by 0 days.

(21) Appl. No.: 16/675,249

(22) Filed: Nov. 6, 2019

(65) Prior Publication Data

US 2021/0136292 A1    May 6, 2021

(51) Int. Cl.

| H04N 7/18 | (2006.01) |
|---|---|
| H04N 19/503 | (2014.01) |
| H04N 5/225 | (2006.01) |
| G06T 7/292 | (2017.01) |
| G06T 7/70 | (2017.01) |
| H04N 5/232 | (2006.01) |
| G06T 7/20 | (2017.01) |
| H04N 5/247 | (2006.01) |
| G06V 20/62 | (2022.01) |
| G06V 40/16 | (2022.01) |

(52) U.S. Cl.
CPC .......... *H04N 5/23296* (2013.01); *G06T 7/20* (2013.01); *G06T 7/70* (2017.01); *H04N 5/23222* (2013.01); *H04N 5/23238* (2013.01); *H04N 5/247* (2013.01); *G06T 2207/20081* (2013.01); *G06T 2207/30168* (2013.01); *G06T 2207/30201* (2013.01); *G06T 2207/30252* (2013.01); *G06V 20/625* (2022.01); *G06V 40/172* (2022.01)

(58) Field of Classification Search
None
See application file for complete search history.

(56) References Cited

U.S. PATENT DOCUMENTS

| 8,026,945 B2 * | 9/2011 | Garoutte | G08B 13/19643 |
| | | | 348/143 |
| 9,549,125 B1 * | 1/2017 | Goyal | H04N 5/23216 |
| 2007/0269077 A1 * | 11/2007 | Neff | G01S 7/41 |
| | | | 382/103 |
| 2011/0135154 A1 * | 6/2011 | Wedge | G06T 7/292 |
| | | | 382/103 |
| 2011/0228092 A1 * | 9/2011 | Park | H04N 19/61 |
| | | | 348/154 |
| 2014/0347475 A1 * | 11/2014 | Divakaran | G06K 9/00771 |
| | | | 348/135 |
| 2017/0006215 A1 * | 1/2017 | Leung | G08B 13/19641 |
| 2017/0091561 A1 * | 3/2017 | Pham | G06K 9/34 |

(Continued)

*Primary Examiner* — Alison Slater

(57) ABSTRACT

According to an aspect of some embodiments of the present invention there is provided a system for imaging of objects in a scene. The system contains a hardware processor, or multiple hardware processors, which execute(s) code for: receiving, from a first sensor, image or images depicting an object or objects, where the object(s) include(s) an autonomous navigation system that controls a course of the object(s) in space, predicting a spatiotemporal profile of the object(s) within the image(s), and generating instructions for execution by a second sensor for capturing an image of the object(s) at a time and location corresponding to the spatiotemporal profile.

8 Claims, 5 Drawing Sheets

(56) References Cited

U.S. PATENT DOCUMENTS

| | | | |
|---|---|---|---|
| 2019/0043207 A1* | 2/2019 | Carranza | G06K 9/00771 |
| 2019/0166286 A1* | 5/2019 | Ouyang | H04N 5/22525 |
| 2019/0212751 A1* | 7/2019 | Zhou | G06K 9/00637 |
| 2020/0057450 A1* | 2/2020 | Calleija | G08G 1/163 |
| 2021/0279475 A1* | 9/2021 | Tusch | H04L 63/0861 |

* cited by examiner

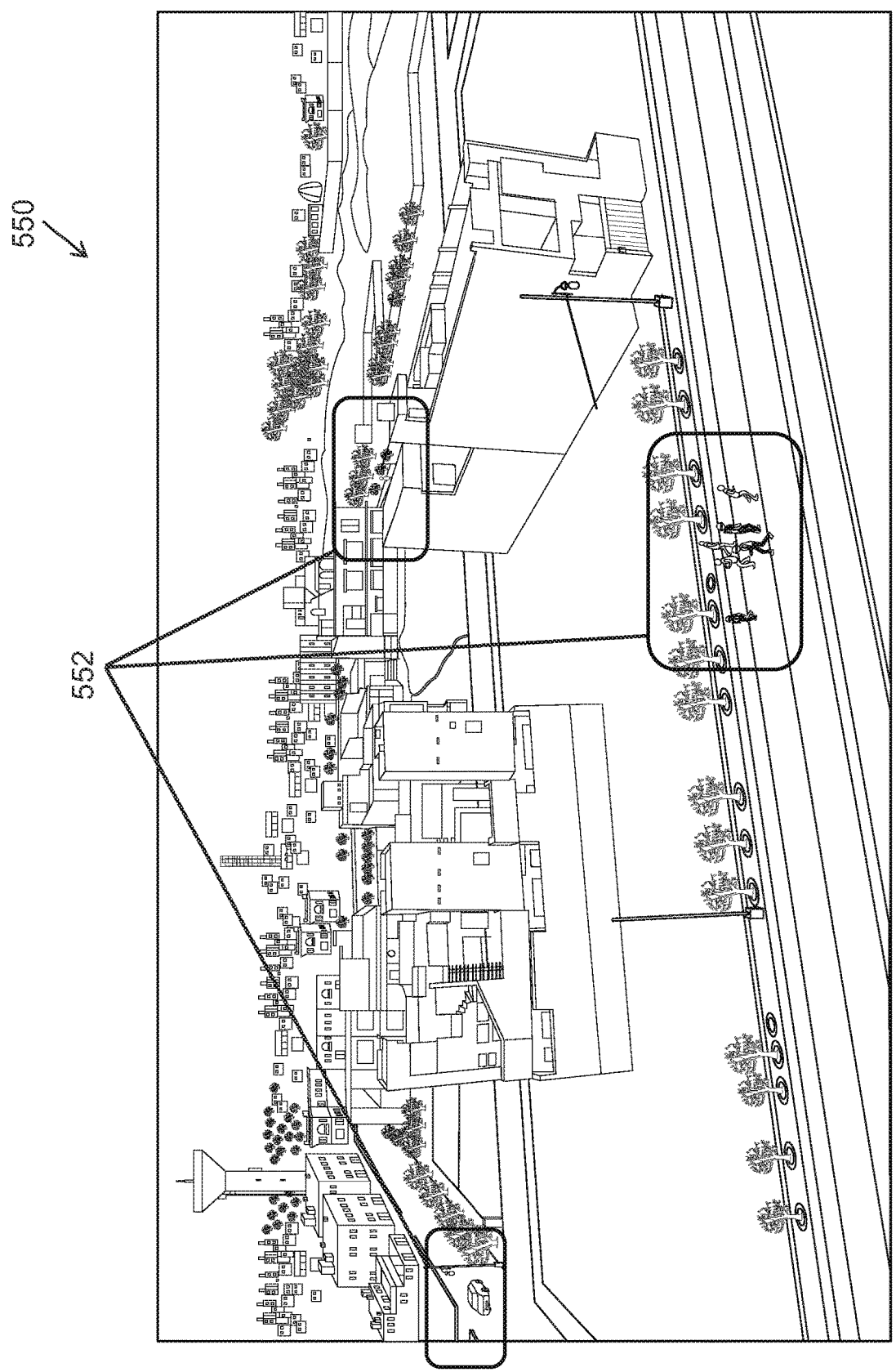

SYSTEMS AND METHODS FOR IMAGING OF MOVING OBJECTS USING MULTIPLE CAMERAS

FIELD AND BACKGROUND OF THE INVENTION

The present invention, in some embodiments thereof, relates to systems and methods for imaging of objects and, more specifically, but not exclusively, to systems and methods for imaging of moving objects.

Imaging of moving objects within a scene may be performed by a wide angle camera that captures images of the scene. The images may be blown up, and items of interest analyzed within the image. For example, an image of a toll highway is captured by a wide angle camera. Each image may include multiple cars. The license plates of the cars are identified, and the alphanumeric characters are extracted. Owners of the cars are billed for the toll according to the license plate.

SUMMARY OF THE INVENTION

According to a first aspect, a system for imaging of at least one object in a scene, comprises: at least one hardware processor executing a code for: receiving, from a first sensor, at least one image depicting the at least one object, wherein the at least one object includes an autonomous navigation system that controls a course of the at least one object within space, predicting a spatiotemporal profile of the at least one object within the at least one image, and generating instructions for execution by a second sensor for capturing an image of the at least one object at a time and location corresponding to the spatiotemporal profile.

According to a second aspect, a system for imaging a plurality of objects in a scene, comprises: at least one hardware processor executing a code for: receiving, for each of a plurality of the objects, at least one respective spatiotemporal profile of a plurality of spatiotemporal profiles computed from at least one image captured by a first sensor depicting the plurality of objects, wherein each one of the plurality of objects includes an autonomous navigation system that controls a course of the respective object within space, scheduling at least one image of each of the plurality of objects for capture by at least one second sensor according to an analysis of the plurality of spatiotemporal profiles, and generating instructions for execution by at least one second sensor for capturing at least one image of each object of the plurality of objects according to the scheduling.

According to a third aspect, a method for imaging each one of a plurality of objects in a scene, comprises: receiving, from a first sensor, at least one image depicting the plurality objects, wherein each one of the plurality of objects includes an autonomous navigation system that controls a course of the respective object within space, predicting at least one spatiotemporal profile of a plurality of spatiotemporal profiles for each of the plurality of objects depicted within the at least one image, and scheduling at least one image of each of the plurality of objects for capture by at least one second sensor according to an analysis of the plurality of spatiotemporal profiles, and generating instructions for execution by at least one second sensor for capturing at least one image of each object of the plurality of objects according to the scheduling.

In a further implementation form of the first, second, and third aspects, the spatiotemporal profile includes values corresponding to prediction of a future time during which the at least one object is predicted to be present at a spatial location, and wherein the instructions are generated for capturing an image of the at least one object at the spatial location at the future time.

In a further implementation form of the first, second, and third aspects, the generated instructions include instructions for capturing a zoom-in image of the at least one object at the time and location corresponding to the spatiotemporal profile.

In a further implementation form of the first, second, and third aspects, the spatiotemporal profile is defined by at least one property of the second sensor for capturing the image of the at least one object at a quality level above a threshold.

In a further implementation form of the first, second, and third aspects, the at least one property of the second sensor comprises an estimated time for automatically adjusting the second sensor from a current viewing angle and/or zoom to the viewing and/or zoom defined by the generated instructions for capturing the image of the at least one object.

In a further implementation form of the first, second, and third aspects, the at least one property of the second sensor comprises an estimated quality of an image captured by the second sensor at a certain spatial location and/or certain time.

In a further implementation form of the first, second, and third aspects, the spatiotemporal profile is computed for a selected pose of the at least one object, wherein the at least one object is predicted to appear in the selected pose at the future time and spatial location defined by the spatiotemporal profile, and wherein the instructions are generated for capturing an image of the at least one object at the selected pose at the future time and spatial location.

In a further implementation form of the first, second, and third aspects, the selected pose is selected from the group consisting of: a frontal view of a face of a person implementation of the object, and a front or back view of a vehicle implementation of the object capturing a license plate.

In a further implementation form of the first, second, and third aspects, the spatiotemporal profile is computed to correspond to a defined spatial location where an image captured by the second sensor is above a quality threshold, wherein the at least one object is predicted to appear at the defined spatial location at the future time defined by the spatiotemporal profile, and wherein the instructions are generated for capturing an image above the quality threshold of the at least one object at the defined spatial location at the future time.

In a further implementation form of the first, second, and third aspects, the defined spatial location is selected according to at least one member of the group consisting of: sufficient lighting, lack of obstructive objects blocking the at least one object, moving objects causing blurriness in the object, lack of strong blinding light.

In a further implementation form of the first, second, and third aspects, the first sensor comprises a wide angle camera, and the second sensor comprises a pan-tilt-zoom (PTZ) camera.

In a further implementation form of the first, second, and third aspects, the first sensor captures images at a resolution below a threshold above a zoom level, and the second sensor captures images at a resolution above the threshold when above the zoom level.

In a further implementation form of the first, second, and third aspects, the spatiotemporal profile is predicted by feeding the at least one image into a model trained on a training dataset of a plurality of images and corresponding spatiotemporal profiles.

In a further implementation form of the first, second, and third aspects, the at least one object comprises a person, and further comprising providing the at least one image of the respective person captured by the second sensor for a biometric analysis thereof.

In a further implementation form of the first, second, and third aspects, each respective spatiotemporal profile is associated with a probability value indicative of likelihood of the respective object being present at the future time and spatial location, wherein the scheduling is optimized according to the probability values of the plurality of spatiotemporal profiles.

In a further implementation form of the first, second, and third aspects, each respective spatiotemporal profile is associated with an estimated image quality of an image of the respective object when captured by the at least one second sensor at a corresponding future time and spatial location.

In a further implementation form of the first, second, and third aspects, the scheduling is performed for capturing at least one image for each of the plurality of objects using a single second sensor.

In a further implementation form of the first, second, and third aspects, a plurality of second sensors are located at a plurality of spaced apart spatial locations and/or at a plurality of viewing angles, and the scheduling is performed for capturing the at least one image of each object using a respective second sensor of the plurality of second sensors for meeting a set of image quality rules.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings:

FIG. 5 is a schematic depicting another image captured by a wide field sensor depicting boundary boxes including target autonomously navigating objects for which respective spatiotemporal profiles are computed and used to generate instructions for capturing images of the respective target objects by a focused sensor, in accordance with some embodiments of the present invention.

DESCRIPTION OF SPECIFIC EMBODIMENTS OF THE INVENTION

Figure 1:
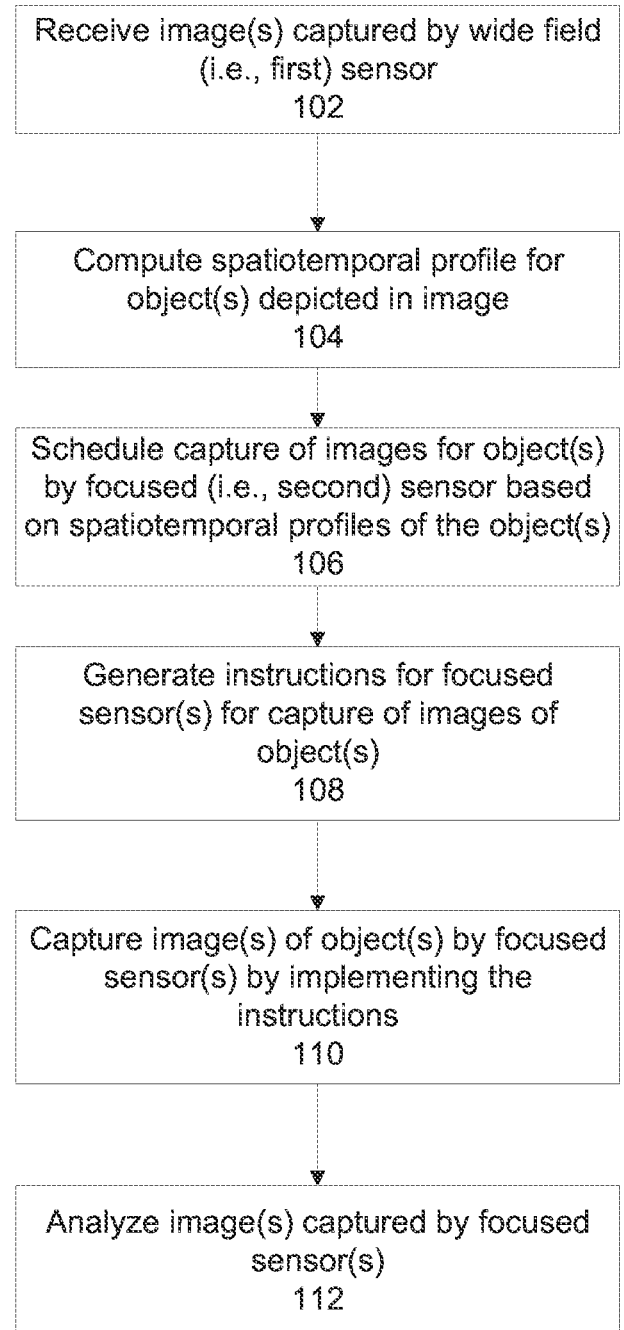
FIG. 1 is a flowchart of a method of capturing image(s) of objects in a scene where the object(s) include an autonomous navigation system, in accordance with some embodiments of the present invention.

The present invention, in some embodiments thereof, relates to systems and methods for imaging of objects and, more specifically, but not exclusively, to systems and methods for imaging of moving objects.

As used herein, autonomously navigated objects include a mechanism for active adjustment of pose, velocity, speed, acceleration, orientation, and/or direction. The control mechanism may be automated (e.g., controlled by a processor executing code instructions stored in a memory) and/or may be manual (e.g., human controlled). For example, a human being may decide where to walk to, how to turn, and what pose to be in. In another example, a vehicle may make turns and/or change driving speed. The vehicle may be manually driven by a human driver and/or autonomously controlled by a processor executing code stored in a memory. In yet another example, a drone (flying autonomously and/or under human operator control) may adjust itself in space using 6 degrees of freedom. In yet another example, an endangered animal in the wild moves quietly and stealthily to avoid detection. The autonomously navigated objects are in contrast to passive objects that move due to external physical forces, for example, a tennis ball flying through the air after being hit by a racket, and an artillery projective flying through the air after being fired from a cannon.

It is noted that at least some implementations of the systems, methods, an apparatus, and/or code instructions described herein for autonomously navigated objects may be used to image non-autonomously navigated objects, such as objects whose movement is due to external forces such as gravity, wind, and/or an initial applied force, such as projectiles.

An aspect of some embodiments of the invention relates to systems, methods, an apparatus, and/or code instructions for imaging of one or more autonomously navigating objects within a scene. A first sensor (also referred to herein as a wide field sensor), optionally a wide angle camera, captures an image of the scene depicting the one or more autonomously navigating objects. A spatiotemporal profile is predicted for the object(s) depicted within the image, optionally a respective spatiotemporal profile for each object. The spatiotemporal profile may include values corresponding to a prediction of a future time and/or spatial location where the object(s) is predicted to be present. The spatiotemporal profile may be computed for a selected pose of the object(s), where the object is predicted to be at the selected pose at the predicted future time and/or spatial location. Instructions are generated for a second sensor (also referred to herein as a focused sensor), optionally a pan-tilt-zoom (PTZ) camera, for capturing an image of the objects) at the time and/or location corresponding to the spatiotemporal profile. The second sensor may be adjusted according to the instructions prior to the predicted future time and prior to the object arriving at the predicted spatial location, such that images(s) of the second sensor are captured when the future time arrives and/or when the object is located at the spatial location. The advanced setup of the second sensor improves quality of the images of the object captured by the second sensor, for example, by reducing vibration of the second sensor due to the positioning movement of the second sensor, and/or by enabling high resolution zoomed in images of the object.

An aspect of some embodiments of the invention relates to systems, methods, an apparatus, and/or code instructions for scheduling imaging of multiple autonomously navigating objects within a scene by a focused sensor. A respective spatiotemporal profile for each one of multiple autonomously navigating objects in a scene is received. The spatiotemporal profile is computed from an image captured by a wide field sensor. Each respective spatiotemporal profile includes a prediction of a future time when the respective object is predicted to be present at a certain spatial location. The spatiotemporal profiles are analyzed, to schedule capturing of one or more images for at least two of the objects in the scene, optionally for all of the objects. Instructions are generated for execution by one or more focused sensors for capturing one or more images of each object according to the scheduling.

An aspect of some embodiments of the invention relates to systems, methods, an apparatus, and/or code instructions for imaging multiple autonomously navigating objects within a scene by a focused sensor. A first sensor (also referred to herein as a wide field sensor), optionally a wide angle camera, captures an image of the scene depicting the one or more autonomously navigating objects. A spatiotemporal profile is predicted for the object(s) depicted within the image, optionally a respective spatiotemporal profile for each object. The spatiotemporal profiles are analyzed, to schedule capturing of one or more images for at least two of the objects in the scene, optionally for all of the objects. Instructions are generated for execution by one or more focused sensors for capturing one or more images of each object according to the scheduling.

At least some implementations of the systems, methods, apparatus, and/or code instructions described herein relate to the technical problem of obtaining high quality images of objects moving within a scene. The high quality images may be defined, for example, as including sufficient lighting (e.g., above a threshold) and/or obtaining the image when the object is at a selected pose. The high quality image may be used, for example, for biometric identification (e.g., scanning for known criminals within a crowd), decoding of certain symbols (e.g., license plate), and/or obtaining artistic images by capturing exciting moments (e.g., impact of baseball on a bat). The technical problem relates to existing sensors (e.g., cameras) used to image the scene are unable to capture images that satisfy the requirement of quality, for example, the resolution of wide angle lenses used to image large areas are not sufficiently high to enable using the images in other applications such as biometric analysis of people in the image. The technical problem further relates to existing sensors (e.g., cameras) that are able to capture the required high quality images of the objects. However, when the objects are moving, the sensor is unable to adequately track the required object in order to actually capture the image. For example, when the object is moving, an image captured by a sensor tracking the object may be blurry. In another example, when multiple objects are in a scene, the number of sensors, the availability of the sensors, the exposure times, the sensor angles, and/or distance limitations may limit the ability of the sensor to track all of the objects continuously in order to try and capture the required high quality images.

At least some implementations of the systems, methods, apparatus, and/or code instructions described herein improve the technology of obtaining high quality images of objects moving within a scene. Standard approaches are designed for passive objects that follow basic physical laws, such as gravity. The passive objects do not have an autonomous navigation system, and once set in motion cannot adjust their trajectory on their own. For example, a ball hit by a racket, or a missile or rocket once fired, have a trajectory defined by the laws of physics and cannot change course. Standard approaches are based on following the passive objects by computing their trajectory using the basis laws of physics (e.g., gravity, friction, wind forces) and taking images accordingly.

The technological improvement is enabled by at least some implementations of the systems, methods, apparatus, and/or code instructions described herein, by the spatiotemporal prediction of the object with autonomous navigation system, and generating instructions for capturing high quality images of the object according to the spatiotemporal prediction. For example, the spatiotemporal prediction includes a geographical location where the object is predicted to be present at a future time interval (e.g., in the next 2-4 seconds), which provides enough time to set the angle and zoom of a high resolution camera to capture a high quality (e.g., high resolution) image of the object at the geographical location at the predicted time. In some implementations, the prediction is computed by a trained machine learning model that is able to predict spatiotemporal values for objects such as humans and cars, which are able to adjust pose and/or location at will.

At least some implementations of the systems, methods, apparatus, and/or code instructions described herein improve the technology of obtaining high quality images of multiple objects, each moving independently and autonomously within a scene, for example, many humans walking within a large corridor, for example, in a terminal on the way to boarding a plane. Using standard approaches, it is technically difficult to track and obtain high quality images of each person in the crowd. The technological improvement is enabled by at least some implementations of the systems, methods, apparatus, and/or code instructions described herein, by a scheduler that receives the spatiotemporal predictions for each person in the crowd, and schedules available sensors for optimal capturing high quality images of the people in the crowd. For example, the scheduler generates different instructions for different high resolution cameras according to predicted locations of the different people in the crowd. The predicted times may be used to maximize image capture by the cameras, for example, by capturing an image of one person at a first future time, and then adjusting the camera to another location to capture an image of another person at a second future time that follows the first future time.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
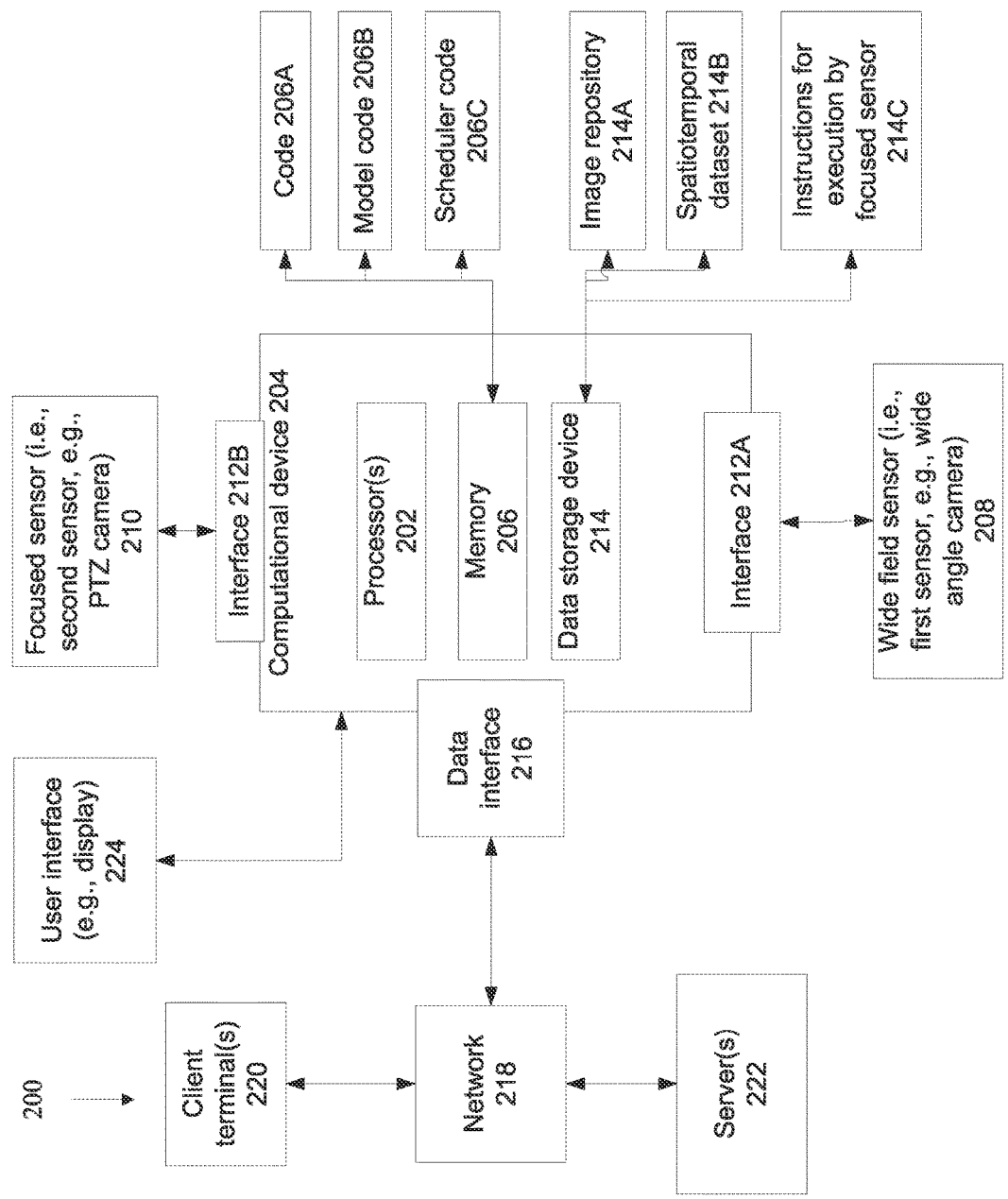
FIG. 2 is a block diagram of components of a system for capturing image(s) of objects in a scene where the object(s) include an autonomous navigation system, in accordance with some embodiments of the present invention.

Reference is now made to FIG. 1, which is a flowchart of a method of capturing image(s) of objects in a scene where the object(s) include an autonomous navigation system, in accordance with some embodiments of the present invention. Reference is also made to FIG. 2, which is a block diagram of components of a system 200 for capturing image(s) of objects in a scene where the object(s) include an autonomous navigation system, in accordance with some embodiments of the present invention. System 200 may implement the acts of the method described with reference to FIG. 1, optionally at least by a hardware processor(s) 202 of a computing device 204 executing code instructions stored in a memory 206.

Computing device 204 may be implemented as, for example, a dedicated device, a client terminal, a server, a virtual server, a virtual machine, a computing cloud, a mobile device, a desktop computer, a thin client, a Smartphone, a Tablet computer, a laptop computer, a wearable computer, glasses computer, and a watch computer.

Computing device 204 may be integrated within a wide field sensor(s) 208 and/or within a focused sensor(s) 210, for example, as code executed by a processor of the wide field sensor 208 and/or the focused sensor 210. Computing device 204 may be an independent device that is connected to wide field sensor 208 and/or focused sensor 210, for example, by cable(s), wireless connection(s), a network, and/or other implementations.

Wide field sensor(s) 208 is designed to capture an image of a scene, for example, implemented as a wide angle camera. Wide field sensor(s) 208 may be installed, for example, on the roof of a corridor to capture a wide angle image of the corridor, and/or as a wide angle camera installed on a wall of a building to capture a wide angle image of a region in front of the building. The wide angle camera may capture images using, for example, visible light, infrared, and/or short wave infrared (SWIR). Wide field sensor(s) 208 may be stationary.

Focused sensor(s) 210 may be designed to capture a close up, high resolution image of an individual object, for example, implemented as a pan-tilt-zoom (PTZ) camera. Focused sensor(s) may be able to lock on a certain location and produce a high-resolution image of the object. Focused sensor(s) 210 may be installed, for example, at a height of an average person to capture close up images of people, and/or at ground level to capture images of license plates of cars.

Wide field sensor(s) 208 and/or focused sensors(s) 210 may be implemented as SWIR cameras that are hidden behind a barrier that is opaque to visible light and transparent to SWIR wavelengths for discreet imaging, and/or mirrors covered with the barrier may be used (e.g., to enable sensor(s) 208 and/or 210) to capture SWIR images reflected from the barrier covered mirrors, for example, as described with reference to "SYSTEMS AND METHODS FOR DISCREET IMAGING OF A SCENE", application Ser. No. 16/521,612, filed on Jul. 25, 2019, by the same inventor as the current application, incorporate herein by reference in its entirety.

Alternatively or additionally, sensors 208 and 210 and/or other sensors may be include radar, lidar, or other sensors for tracking the location and/or pose and/or posture of the object. Alternatively or additionally, sensors 208 and 210 may include illumination elements for illuminating the target object, for example, using visible light, SWIR, and/or other wavelengths.

Optionally, the resolution of the first sensor is not sufficiently high for the target application, for example, for performing a biometric analysis of the face of the person depicted in the image to identify the person (e.g., known criminal). The resolution of the second sensor may be sufficiently high for the target application, but the object may be moving too fast for the capability of the second sensor to capture a clear and/or high quality image. The first sensor may capture images at a resolution below a threshold optionally when above a zoom level and the second sensor captures images at a resolution above the threshold optionally when above the zoom level. The resolution threshold and/or zoom level may be set for sufficiently analyzing the images for a target application, for example, identification of a person according to their face depicted in the image. An insufficiently resolution and/or insufficient zoom may result in inability to perform the target application, for example, inability to correctly identify who the person is.

Computing device 204 receives images (and/or other sensor data as described herein) from wide field sensor(s) 208, predicts a spatiotemporal profile for respective objects within the image, and generates instructions for execution by focused sensor(s) 210 for capturing an image of the respective object. Alternatively or additionally, computing device 204 receives computed spatiotemporal profiles, and schedules capturing of multiple images of multiple objects by one or more focused sensor(s) 210 according to the spatiotemporal profiles.

Computing device 204 may receive the images captured by wide field sensor(s) 208 and/or provide the generated instructions to focused sensor(s) 210 using one or more imaging interfaces 212A-B, for example, a wire connection (e.g., physical port), a wireless connection (e.g., antenna), a local bus, a network interface card, other physical interface implementations, and/or virtual interfaces (e.g., software interface, virtual private network (VPN) connection, application programming interface (API), software development kit (SDK)). It is noted that imaging interfaces 212A-B may be implemented as a single interface and/or as two independent interfaces (e.g., two ports for attachment of cables).

Hardware processor(s) 202 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include one or more processors (homogenous or heterogeneous), which may be arranged for parallel processing, as clusters and/or as one or more multi core processing units.

Memory 206 (also referred to herein as a program store, and/or data storage device) stores code instruction for execution by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code 206A that implements one or more acts and/or features of the method described with reference to FIG. 1, including for example, code of a trained model 206B for outputting the spatiotemporal profile, and/or code of a scheduler 206C for scheduling capturing of focused images by focused sensor 210 based on the spatiotemporal profiles.

Computing device 204 may include a data storage device 214 for storing data, for example, an image repository 214A for storing images captured by wide field sensor(s) 208, a spatiotemporal repository 214B for storing computed spatiotemporal values, and/or an instruction repository 214C for storing computed instructions for focused sensor(s) 210.

Data storage device 222 may be implemented as, for example, a memory, a local hard-drive, a removable storage device, an optical disk, a storage device, and/or as a remote server and/or computing cloud (e.g., accessed over a network). It is noted that repositories 214A-C may be stored in data storage device 222, with executing portions loaded into memory 206 for execution by processor(s) 202.

Computing device 204 may include a data interface 216, optionally a network interface, for connecting to a network 218, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 may communicate using network 218 (or another communication channel, such as through a direct link (e.g., cable, wireless) and/or indirect link (e.g., via an intermediary computing device such as a server, and/or via a storage device) for example, with client terminal(s) 220 and/or server(s) 222, for example, to provide the focused images obtained by focused sensor(s) 210 such as for biometric analysis and/or to identify license plates. In another example, computing device 204 may be remotely controlled by client terminal(s) 220 and/or server(s) 222, for example, a set of rules defining scheduling may be remotely provided. Alternatively or additionally, further processing of the focused images obtained by focused sensor(s) 210 may be performed by code executed by computing device 204.

It is noted that interfaces 212A-B and 216 may be implemented, for example, as independent interfaces (e.g., independent physical connection ports), as virtual interfaces on a common physical interface (e.g., virtual networks on a common network port), and/or integrated into a single interface (e.g., network interface).

Computing device 204 includes or is in communication with a user interface 224 that includes a mechanism designed for a user to enter data (e.g., define settings such as what defines a quality image, set of rules for optimizing scheduling of images) and/or view the captured images. Exemplary user interfaces 224 include, for example, one or more of, a touchscreen, a display, a keyboard, a mouse, and voice activated software using speakers and microphone.

At 102, one or more images captured by a first sensor (i.e., wide field sensor) are received and/or provided. The image(s) depict one or more autonomously navigating objects.

Example use cases include: a wide angle view camera placed in a hallway leading up to airport gates, where the objects are people, and close up images of the people (captured by the focus sensor) may be analyzed to detect known criminals. In another example, a wide angle view camera is placed on a ground beside a sensitive military site, the objects are drones flying in the sky, and close up images (captured by the focus sensor) of the drones may be analyzed to detect type and/or manufacturer and/or model of the drone such as to assess a possible threat and/or to assess who sent the drone.

It is noted that when multiple objects are depicted in the image(s), scheduling of images captured by the focus sensor may be performed as described with reference to 106.

At 104, a spatiotemporal profile of the object(s) depicted within the image is computed. Optionally, a respective spatiotemporal profile is computed per object, optionally for each object in the image. Alternatively or additionally, multiple spatiotemporal profiles are computed for each object, for example, to capture multiple images of the object at different poses (e.g., postures), and/or under different lighting conditions, and/or at different spatial locations. For example, a set of values of future time and/or spatial locations is computed, where each value (or each pair of future time and/or spatial locations) is optionally associated with a probability score and/or quality value. For example, the spatial location where the object is predicted to be in 1 second, in 2 seconds, and in 3 seconds, optionally each with an associated probability indicative of accuracy of the prediction (e.g., 92%, 84%, 73%), and/or an indication of quality of an image of the object captured by a second sensor (e.g., high quality, medium quality, low quality). In terms of mathematical representation, the spatiotemporal profile includes: in $T_i$ milliseconds, the object is predicted to be at location $X_i$, $Y_i$, at a probability $P_i$, and with an imaging quality of $Q_i$, for multiple values of $\{i\}$. Scheduling may be performed, for example, to maximize the imaging quality (or imaging quality above a threshold) and/or maximize probability of obtaining the image (or probability above a threshold) and/or maximize another function.

The objects of interest may be identified in the image(s), for example, by image processing code (e.g., neural network trained to identify objects, code that extracts features from the image and identifies the object based on a set of feature), and/or by the process that computes the spatiotemporal profile (e.g., model, such as a neural network that directly outputs the spatiotemporal profile for the object without necessarily providing an indication of the object). Objects may be explicitly identified, and the spatiotemporal profile computed for the explicitly identified objects. The pose and/or orientation of the objects may be detected and used to compute the spatiotemporal profile (e.g., fed into the model). Alternatively or additionally, objects are not explicitly identified, with the spatiotemporal profile being computed for implicitly identified objects, and/or without directly identifying the objects and/or without identifying the objects at all.

The spatiotemporal profile may be computed for the object within a defined boundary box (or other geometrical shape). The boundary box may be defined, for example, according to the properties of the second sensor, for example, an image captured by the second sensor includes the entire contents of the boundary box, and/or directly corresponds to the size of the boundary box (e.g., varies according to zooming, and/or hardware of the second sensor). The spatial location and/or future time of the boundary box may be defined by the spatiotemporal profile. The boundary box is expected to depict the object therein. Instructions for capturing the image of the object by the second sensor (e.g., as described with reference to 108) may be generated for depicting the contents of the boundary box.

The spatiotemporal profile denotes a prediction of the object. The spatiotemporal profile includes values corresponding to prediction of a future time during which the object is predicted to be present at a spatial location. The spatial location may be converted to and/or represented using a suitable set of values, for example, latitude and/or longitude values, customized coordinate system for the scene, and/or mapped to pixels of the image captured by the first sensor (e.g., when the orientation of the first sensor is fixed such that the same scene is captured in the images). For example, when imaging a hallway, in 3 seconds the object will be located within 2 meters of the first door of the left side of the hallway, or the object will be located at pixel coordinates (322, 42) of the image, or the object will be located at the corresponding set of latitude and longitude values.

The one of the future time and spatial location may be fixed, with the other parameter being predicted. For example, the future time is preset at 2 seconds, and the spatial location for 2 seconds in the future is predicted. Alternatively, the spatial location is set (e.g., person stepping within a certain large tile on the floor) and the future time is predicted when the object reaches the set spatial location (e.g., person will reach the certain large tile in about 4 seconds). Alternatively both future time and spatial location are predicted.

It is noted that even if a high quality second sensor (e.g., PTZ) camera is available, the time required to set the camera, for example, move the camera to a new position, zoom, refocus, and/or stability the image may be significant, for example, on the order of hundreds of even thousands of milliseconds), during which the object may have moved to a new location and/or changed pose. Prediction may be performed to take into account the time to set the camera.

Future time and/or spatial location may be predicted for other defined properties, for example, as follows:

Optionally, the spatiotemporal profile is computed for a selected pose of the object, for example, limb position for humans and/or animals, head orientation for humans and/or animals, and forward facing wheels, license plate, and/or another angle for vehicles. The spatiotemporal profile includes the future time and/or spatial location where, wherein the object is predicted to appear in the selected pose. An image captured by the second sensor at the predicted future time and predicted spatial location (e.g., based on generated instructions as described herein) is expected to depict the object at the selected pose. Exemplary poses include: a frontal view of a face of a person (i.e., when the object is a person), and a front or back view of a vehicle for capturing a license plate from which the alphanumeric characters may be accurately extracted (i.e., when the object is a vehicle).

Optionally, the spatiotemporal profile is computed for a target motion speed of the object, for example, to capture the object when the object is predicted to be at rest, or to capture the object moving at a certain speed.

Optionally, future time and/or spatial location of the spatiotemporal profile are defined by one or more properties of the second sensor. The properties of the second sensor may be set as fixed values, with the future time and/or spatial location computed to satisfy the fixed values of the properties of the second sensor.

Optionally, the property of the second sensor is capturing an image of the object at a quality level above a threshold. The threshold may be set, for example, to obtain an image of sufficient quality (e.g., resolution, zoom, lack of blur due to motion/vibration) for biometric analysis, or other application. For example, the hardware of the second sensor enables obtaining the quality level above the threshold when at least a zoom of 20× is used and the object is entirely within the image. The predicted time and/or predicted location of the object may be to obtain an image of the object using 20× zoom where the object is entirely depicted in the image.

Alternatively or additionally, the property of the second sensor is an estimated time for automatically adjusting the second sensor from a current viewing angle and/or zoom to the viewing and/or zoom defined by the generated instructions for capturing the image of the at least one object. For example, 1.5 seconds are required to dampen vibrations occurring from re-orienting the second sensor to a new angle and/or zoom. The predicted time of the profile is set to be at least 1.5 seconds, and the spatial location of the object in over 1.5 seconds is predicted.

Alternatively or additionally, the property of the second sensor is an estimated quality of an image captured by the second sensor at a certain spatial location and/or certain time. Desired spatial locations and/or times to obtain quality images may be set and/or avoided. For example, for people walking in a hallway, a spatial location near a rotating door is to be avoided, since the rotating door may reduce quality of the image. The profile is computed accordingly. In another example, for people walking in a hallway, a certain part of the hallway has better lighting, and the spatial locations of the better lighting may be set, with the predicted time when the person will be at the lit location being computed.

Alternatively or additionally, the spatiotemporal profile is computed to correspond to a defined spatial location where an image captured by the second sensor is above a quality threshold. The defined spatial location may be selected according to one or more of the following properties: sufficient lighting, lack of obstructive objects blocking the object, lack of moving objects causing blurriness of the object, and lack of strong blinding light. The spatial location may be selected manually and/or automatically, for example, by image analysis code that pre-analyzes the image to select the spatial location for future images. The object is predicted to appear at the defined spatial location at the future time defined by the spatiotemporal profile. An image captured by the second sensor at the defined spatial location and future time is expected to have a quality level above the quality threshold.

Optionally, the spatiotemporal profile is predicted by feeding the image(s) into a machine model. Multiple images may be fed into the model, optionally with associated time stamps and/or known time intervals between images. The sequence of images may be analyzed by the model to determine previous motion of the object and/or a current vector of the object denoting direction and/or speed of motion. The model may be trained on a training dataset of images and corresponding spatiotemporal profiles. The model may learn to predict navigation of the objects, for example, people may tend to look in a direction of a screen or an advertisement, or may look towards a door, or may look down while stepping on an escalator. In another example, a drone may stay away from large objects such as buildings, and may stop and hover over interesting features on land.

The model may be implemented, for example, as one or multiple components and/or artificial intelligence code. For example, multiple components may be trained, which may process data in parallel and/or as a pipeline. For example, output of one type of component (e.g., from intermediate layers of a neural network) is fed as input into another type of component. Exemplary models and/or components include: one or more neural networks of various architectures (e.g., artificial, deep, convolutional, fully connected), Markov chains, support vector machine (SVM), logistic regression, k-nearest neighbor, and decision trees. Models may be trained using a training dataset, of an initial set of values (e.g., current spatial location, current time, and/or current orientation and/or pose) and a set of target desired values (e.g., desired spatial location to obtain desired image quality, time delay, and/or target orientation and/or pose). Alternatively or additionally, models may be based on a set of rules, which may be defined and/or automatically learned, for example, the model may learn (or be instructed) that certain spatial locations and/or areas of the image captured by the first sensor are dark and/or other regions are too bright and/or other regions have optimal lighting, where each region may be associated with a certain image quality level. The predictions may be computed to predict when the object will be located at a certain region to generate the best image quality (or image quality level above a threshold). In another example, the model may learn (and/or be instructed) how to recognize that an object such as a person is currently turning (e.g., based on measured head, feet, and/or hand, orientation and/or position, or for a non-human object such as a car the orientation and/or position) and/or predict when the object will reach a target pose and/or orientation for imaging by a second image sensor.

At 106, capturing of one or more images by the second sensor(s) may be scheduled. Scheduling may be performed when there are multiple objects in the scene, for capturing an image(s) for each of the different objects. Scheduling may be performed when there are multiple spatiotemporal profiles defined for the same object, for capturing multiple images of the same object.

Scheduling may be performed for capturing images using a single second sensor, for example, different objects are scheduled by being imaged by the same second sensor at different spatial locations and/or different times, for example, by sweeping the second from left to right, first objects appearing at the left at earlier times are scheduled followed by objects appearing in the middle and/or right at later times.

Alternatively, scheduling is performed for capturing images using multiple second sensors. Multiple second sensors may be located at multiple spaced apart spatial locations and/or at multiple viewing angles. The scheduling may be performed for capturing the image of each object using a respective second sensor, for example, meeting a set of image quality rules, for example, to capture higher quality images over lower quality images, and/or to capture images at least having a quality level above a threshold, where the quality level may be evaluated dynamically in real time while the image is being captured. For example, each second sensor is instructed to capture an image of a different object, such the second sensor closest to each respective object according to location and/or time predicted by the profile is designated for capturing image(s) of the respective object. Scheduling may be performed according to availability of the respective sensors.

Alternatively, scheduling is not performed, for example, when there is a single object, a single spatiotemporal profile.

The scheduling is performed according to an analysis of the plurality of spatiotemporal profiles, optionally to optimize meeting as many of the spatiotemporal profiles as possible. For example, to capture as many images of different objects as possible, such as in a hallway where a large number of people walk, to capture as many images depicting full view of the faces of as many people as possible.

Optionally, when each respective spatiotemporal profile is associated with a probability value indicative of likelihood of the respective object being present at the future time and spatial location, the scheduling is optimized according to the probability values of the spatiotemporal profiles. For example, images are scheduled according to the maximal probability value to maximize likelihood of obtaining desired images, for example, over lower probability values where obtaining desired images is less likely.

Optionally, when each respective spatiotemporal profile is associated with an estimated image quality of the image of the respective object when captured by second sensor at a corresponding future time and spatial location, scheduling may be performed to capture higher quality images over lower quality images.

At 108, instructions for execution by the second sensor(s) for capturing an image(s) of the object(s) at the future time and/or spatial location corresponding to the spatiotemporal profile are generated. The instructions may be generated for one or multiple second sensor(s), such as per second sensor. Instructions may be generated according to the scheduling.

Instructions may define, for example, a zoom-in, and/or camera viewing angle (pan and/or tilt) which may be defined by a set of angular coordinates.

Instructions may define adjustment of an illumination source, for illuminating the object for capturing an image thereof by the second sensor.

Instructions may be code, such as binary code, compiled code, test based instructions, and/or values for predefined parameters. Instructions may be defined for execution by hardware processor(s) that control the second sensor(s), for example, hardware processor(s) of a camera that includes the second sensor(s).

At 110, the second sensor(s) capture(s) image(s) of the object(s) when the instructions are implemented.

At 112, the image are provided and/or analyzed. Images may be provided, for example, presented on a display, stored in a memory, provided to another executing process, and/or provided to another computing device.

Images may be analyzed, for example, when the object is a person the image of the person is analyzed for performing a biometric analysis, such as identifying the person. In another example, when the object is a drone, the image of the drone is analyzed to determine the make and/or model and/or manufacturer of the drone.

Image may be provided, for example, for artistic purposes, such as capturing an image of a rare species in the wild at a target pose.

Figure 3:
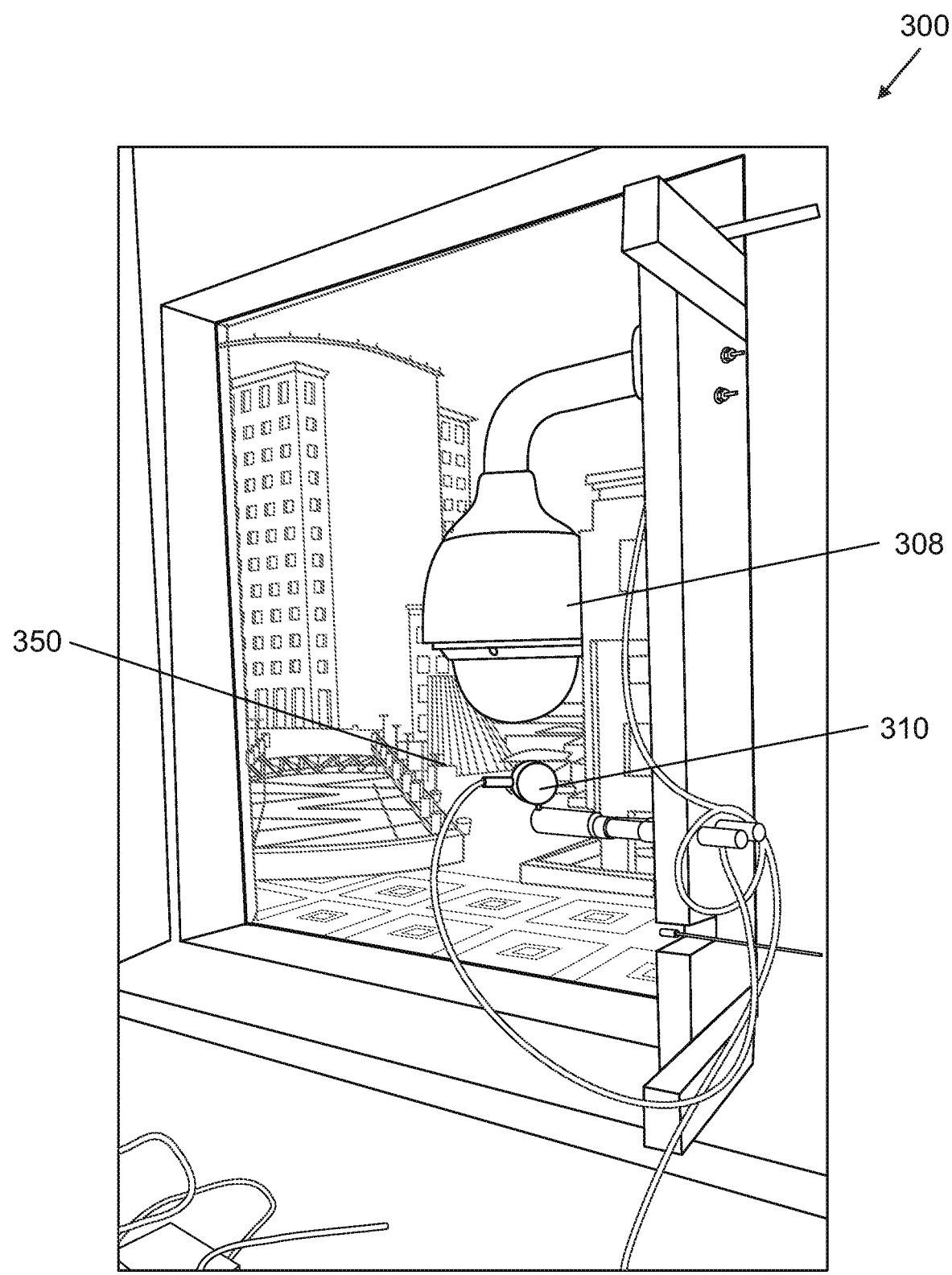
FIG. 3 is a schematic depicting an exemplary setup for capturing images of autonomously navigating objects, in accordance with some embodiments of the present invention.

Reference is now made to FIG. 3, which is a schematic depicting an exemplary setup 300 for capturing images of autonomously navigating objects, in accordance with some embodiments of the present invention. A wide field (i.e., first) sensor 308, optionally a wide angle camera, captures image(s) of a scene depicting objects, for example, an entrance to a building 350 where the objects are people, or the sky in front of the building 350 where the objects are drones. A focused (i.e., second) sensor 310, optionally a PTZ camera, captures higher quality, zoom in image(s) of the objects according to instructions generated based on a spatiotemporal profile(s) computed for object(s) depicted in image(s) captured by wide field sensor 308, as described herein. As shown, wide field sensor 308 and focused sensor 310 are located behind a window of building 350.

Figure 4:
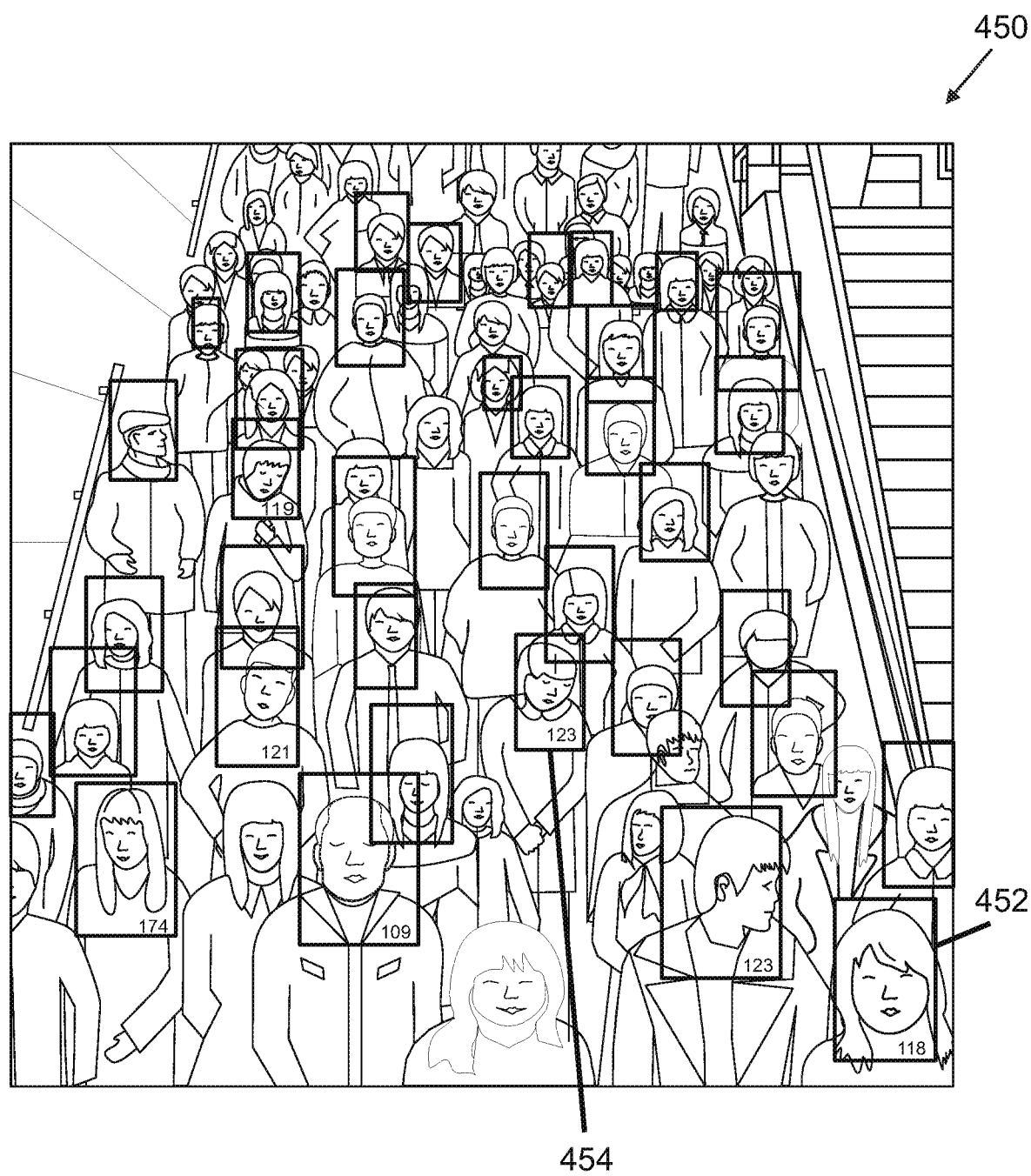
FIG. 4 is a schematic depicting an image captured by a wide field sensor depicting boundary boxes including target autonomously navigating objects for which respective spatiotemporal profiles are computed and used to generate instructions for capturing images of the respective target objects by a focused sensor, in accordance with some embodiments of the present invention.

Reference is now made to FIG. 4, which is a schematic depicting an image 450 captured by a wide field (i.e., first) sensor, optionally a wide angle camera, depicting boundary boxes including target autonomously navigating objects for which respective spatiotemporal profiles are computed and used to generate instructions for capturing images of the respective target objects by a focused (i.e., second) sensor, in accordance with some embodiments of the present invention. The image captured by the first sensor is of a wide staircase and corridor where a large number of people, which are the autonomously navigating objects in this case, are walking down (e.g., leading to a subway, airplane boarding gates, a building). The goal is to obtain a high quality image depicting a front facing face of each of the people, however, at any given point in time some people are too far from the camera, some are too close to the camera, some are partially or fully blocked by other people, and some are looking away from the camera.

The first sensor may be located on a ceiling for imaging the entire staircase. The second sensor may be located on the ground level, for capturing images of faces of the people after walking down the staircase. There may be multiple second sensors, which may be controlled by scheduling, as described herein. Mirrors may be used. Covert mirrors (i.e., where the mirror is covered by an opaque layer so that the mirror is not visible to a human eye but still reflects SWIR wavelengths) may be used, for capturing SWIR images, for example, as described with reference to application Ser. No. 16/521,612.

Spatiotemporal profiles are computed for boundary boxes defining faces of people, for capturing images by the second sensor of the faces at a front facing pose. Spatiotemporal profiles may be computed to predict when the face of each person enters a 'good zone' for obtaining a quality image (e.g., not too far and not too close to the camera, and/or under good lighting, and/or not obstructed by others), and/or when the person faces forward (i.e., target pose).

For example, the spatiotemporal profile for boundary box 452 may include values for capturing an image in the next half second, since the person is already at the target pose, but is partially obstructed by another person in front. The person in front is predicted to move out of the way in a half second, and the front facing pose is predicted to remain. In another example, the spatiotemporal profile for boundary box 454 includes values for capturing an image of the person depicted in the boundary box by a second sensor in 2 seconds, and at a location about 150 pixels lower than the current location of the boundary box (e.g., which may be translated to a change in tilt angle of the second sensor). The person, whose face is currently looking down, is predicted to face forward at the target pose in about 2 second wait time and be present at the lower location in 2 seconds since the person is walking down stairs. The images of the faces at the target pose captured by the second sensor may be provided for biometric analysis, for example, to identify people of interest, such as known criminals.

Reference is now made to FIG. 5, which is a schematic depicting another image 550 captured by a wide field (i.e., first) sensor, optionally a wide angle camera, depicting boundary boxes 552 including target autonomously navigating objects for which respective spatiotemporal profiles are computed and used to generate instructions for capturing images of the respective target objects by a focused (i.e., second) sensor, in accordance with some embodiments of the present invention. Boundary boxes 552 may include people and cars. It is noted that details of the people and cars, which cannot be ascertained by image 550 captured by the wide angle camera, may be ascertained by another image captured by the focused sensor, as described herein. It is noted that boundary boxes 552 are located at different parts of image 550, and depict objects at various distances. Scheduling may be performed as described herein to capture as many images of boundary boxes 552 by the second sensor as practically possible, while meeting image quality requirements, by generating instructions for moving the second sensor and/or zooming the second sensor, as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sensors will be developed and the scope of the term sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for maximizing a number of different imaging a plurality of objects present in a scene being individually image-captured by a single second sensor, comprising:
    a first sensor;
    said single second sensor; and
    at least one hardware processor, said at least one hardware processor communicating with said first sensor and said single second sensor through at least one interface and executing a code for controlling said single second sensor to capture a maximum number of different objects, each to be captured by said single second sensor in a different image, by:
    receiving, for each of a plurality of different objects appearing simultaneously in a same image of at least one image captured by said first sensor, at least one respective spatiotemporal profile of a plurality of spatiotemporal profiles computed from said at least one image, wherein each of said at least one respective spatiotemporal profile includes values corresponding to prediction of a future time during which a respective object is predicted to be present at a certain spatial location;
    wherein each of the plurality of different objects includes an autonomous navigation system that controls a course of the respective object within space;
    calculating a sequence of a plurality of image capture operations conducted by said single second sensor for capturing said maximum number of different objects of the plurality of different objects each different object to be individually captured in an image, by determining an order and timing of each of said plurality of image capture operations, wherein said calculating includes analyzing the plurality of spatiotemporal profiles;
    determining a schedule for said single second sensor adjustment for at least two different locations or times, up to a maximum number of spatiotemporal profiles;
    obtaining at least two different images captured by said single second sensor, each of a different object, up to a maximum number of images of different objects, wherein the maximum number of different images of different objects is equal to the maximum number of spatiotemporal profiles;
    repeatedly adjusting said single second sensor according to the schedule and acquiring images after each adjustment;
    generating and transmitting to said single second sensor, instructions for execution by said single second sensor for sequentially capturing said at least one image of each of said maximum number of different objects, according to the calculating, the determining, the obtaining and the adjusting; and
    outputting said at least one image of each of said maximum number of different objects captured by said single second camera for identification analysis of each of said maximum number of different objects;
    wherein said single second sensor is configured to sequentially capture an image of said each of said maximum number of different objects, according to said instructions received from said at least one hardware processor and executed by said single second sensor.

2. The system of claim 1, wherein each respective spatiotemporal profile is associated with a probability value indicative of likelihood of the respective object being present at the future time and spatial location, wherein the scheduling is optimized according to the probability values of the plurality of spatiotemporal profiles.

3. The system of claim 1, wherein each respective spatiotemporal profile is associated with an estimated image quality of an image of the respective object when captured by said single second sensor at a corresponding future time and spatial location.

4. The system of claim 1, wherein a plurality of second sensors are located at a plurality of spaced apart spatial locations and/or at a plurality of viewing angles, and the scheduling is performed for capturing the at least one image of each object using a respective second sensor of the plurality of second sensors for meeting a set of image quality rules.

5. A method for maximizing a number of different objects present in a scene being individually image-captured by a single second sensor, comprising:
    by at least one hardware processor, controlling said single second sensor to capture a maximum number of different objects, each to be captured by said single second sensor in a different image, by:
    receiving, from a first sensor, at least one image depicting a plurality of different objects appearing simultaneously in a same image of at least one image captured by said first sensor, wherein each of the plurality of different objects includes an autonomous navigation system that controls a course of the respective object within space, wherein each of said at least one respective spatiotemporal profile includes values corresponding to prediction of a future time during which a respective object is predicted to be present at a certain spatial location;
    predicting at least one spatiotemporal profile of a plurality of spatiotemporal profiles for each of the plurality of different objects depicted within the at least one image;
    calculating a sequence of a plurality of image capture operations conducted by said single second sensor for capturing said maximum number of different objects of the plurality of different objects each different object to be individually captured in an image, by determining an order and timing of each of said plurality of image capture operations, wherein said calculating includes analyzing the plurality of spatiotemporal profiles;
    determining a schedule for said single second sensor adjustment for at least two different locations or times, up to a maximum number of spatiotemporal profiles;
    obtaining at least two different images captured by said single second sensor, each of a different object, up to a maximum number of images of different objects, wherein the maximum number of different images of different objects is equal to the maximum number of spatiotemporal profiles;

repeatedly adjusting said single second sensor according to the schedule and acquiring images after each adjustment;

generating and transmitting to said single second sensor, instructions for execution by said single second sensor for sequentially capturing said at least one image of each of said maximum number of different objects according to the calculating, the determining, the obtaining and the adjusting;

outputting said at least one image of each of said maximum number of different objects captured by said single second camera for identification analysis of each of said maximum number of different objects;

by said single second sensor, sequentially capturing an image of said each of said maximum number of different objects, according to said instructions received from said at least one hardware processor and executed by said single second sensor.

6. The system of claim 1, wherein sequentially capturing an image of said each of said maximum number of different objects is by imaging by the single second sensor different objects at different spatial locations and/or different times by sweeping the single second sensor from a first direction to a second direction, first objects appearing at the first direction at a first time point are scheduled followed by objects appearing in the second direction at a second time point later than said first time point.

7. The system of claim 1, wherein said different objects are persons and wherein said hardware processor further executing code for analyzing using biometric analysis said at least one image of each of said maximum number of different persons captured by said single second sensor to identify said different persons.

8. The system of claim 1, wherein said different objects are vehicles and wherein said hardware processor further executing code for analyzing said at least one image of each of said maximum number of different vehicles captured by said single second sensor to identify license plates of said different vehicles.

* * * * *